United States Patent
Mariano et al.

(10) Patent No.: US 7,843,687 B2
(45) Date of Patent: Nov. 30, 2010

(54) LATCHING MECHANISM

(75) Inventors: Ricardo Mariano, Hayward, CA (US);
Gregory Springer, Sunnyvale, CA (US);
Peter Russell-Clarke, San Francisco,
CA (US); Daniele De Iuliis, San
Francisco, CA (US); Boyu Lin, Milpitas,
CA (US)

(73) Assignee: Apple Inc., Cupertino, CA (US)

( * ) Notice: Subject to any disclaimer, the term of this patent is extended or adjusted under 35 U.S.C. 154(b) by 751 days.

(21) Appl. No.: 11/831,231

(22) Filed: Jul. 31, 2007

(65) Prior Publication Data

US 2009/0034220 A1   Feb. 5, 2009

(51) Int. Cl.
*G06F 1/16* (2006.01)
*H05K 5/00* (2006.01)
*H05K 7/00* (2006.01)

(52) U.S. Cl. ............................ 361/679.58; 361/679.02

(58) Field of Classification Search ............ 361/679.02, 361/679.33, 679.37, 679.57, 679.58, 724–727
See application file for complete search history.

(56) References Cited

U.S. PATENT DOCUMENTS

| | | | |
|---|---|---|---|
| 5,825,626 A * | 10/1998 | Hulick et al. ................ 361/724 |
| 5,997,115 A * | 12/1999 | Radloff et al. .............. 312/222 |
| 6,209,975 B1 * | 4/2001 | Lai ........................... 312/223.2 |
| 6,252,514 B1 * | 6/2001 | Nolan et al. ............. 340/686.4 |
| 6,452,788 B1 * | 9/2002 | Crowley ................. 361/679.37 |
| 6,529,382 B2 * | 3/2003 | Terao ......................... 361/726 |
| 6,952,342 B1 * | 10/2005 | Chen ..................... 361/679.38 |
| 7,180,755 B1 * | 2/2007 | Reznikov ..................... 361/797 |
| 7,230,690 B2 * | 6/2007 | Smith et al. ................... 356/73 |
| 7,290,842 B1 * | 11/2007 | Lai ........................... 312/223.2 |
| 7,480,148 B2 * | 1/2009 | Chen et al. .................. 361/726 |
| 7,486,506 B2 * | 2/2009 | Chen et al. ............. 361/679.02 |
| 7,499,271 B2 * | 3/2009 | Wagatsuma et al. .... 361/679.33 |
| 7,542,295 B2 * | 6/2009 | Imsand ........................ 361/726 |
| 2001/0040786 A1 * | 11/2001 | Chang ......................... 361/685 |
| 2003/0011977 A1 * | 1/2003 | Song et al. ................... 361/684 |
| 2003/0147220 A1 * | 8/2003 | Fairchild .................... 361/726 |
| 2004/0012921 A1 * | 1/2004 | Hidaka et al. ............... 361/685 |
| 2004/0240166 A1 * | 12/2004 | Kuo ............................ 361/683 |
| 2006/0250766 A1 * | 11/2006 | Blaalid et al. ............... 361/685 |
| 2007/0144983 A1 * | 6/2007 | Fan et al. ...................... 211/26 |
| 2007/0159786 A1 * | 7/2007 | Liu et al. ..................... 361/685 |
| 2007/0217142 A1 * | 9/2007 | Wagatsuma et al. ......... 361/685 |
| 2007/0217143 A1 * | 9/2007 | Wagatsuma et al. ......... 361/685 |
| 2007/0247802 A1 * | 10/2007 | Imsand ....................... 361/685 |
| 2008/0128569 A1 * | 6/2008 | Wu et al. ................. 248/213.2 |

* cited by examiner

*Primary Examiner*—Jayprakash N Gandhi
*Assistant Examiner*—Adrian S Wilson
(74) *Attorney, Agent, or Firm*—Beyer Law Group LLP

(57) ABSTRACT

An electronic device is disclosed. The electronic device may include a first side and a second side. The electronic device may also include a lid configured to cover an opening on the first side. The lid may include an interior side. The interior side may be invisible from outside of the electronic device when the lid covers the opening. The electronic device may also include a latching mechanism including a slider configured to slide along at least one of the lid and the first side for latching the lid at the interior side. The electronic device may also include a control unit disposed on the second side and configured to actuate movement of the slider.

40 Claims, 4 Drawing Sheets

LATCHING MECHANISM

BACKGROUND OF THE INVENTION

An electronic device, such as a computer, may include a removable lid or enclosure. A user may be able to remove the lid or enclosure, for example, for installing or replacing one or more components inside the electronic device.

In general, the lid may be secured on the housing of the electronic device by a plurality of fasteners, such as screws. In order to remove the lid or to secure the lid, a user typically needs an additional tool, such as a screwdriver, to remove the fasteners. If the user does not have a tool at hand, the user may not be able to remove or secure the lid.

Each of the plurality of fasteners may have to be individually removed. Therefore, removing and securing the lid may be time-consuming. Further, one or more of the fasteners may be missing. If one or more of the fasteners are missing, the user may need to purchase replacement fasteners; otherwise, the lid may not be properly secured in place.

Typically, the fasteners are disposed on the exterior surface of the lid. Accordingly, the appearance of the electronic device may not be aesthetically desirable. Further, dust or other contaminants may accumulate on the fasteners and corresponding mating structures/features (e.g., screw holes) on the lid. Therefore, it may be inconvenient to maintain cleanness of the electronic device.

In addition, the fasteners and mating structures/features on the lid may also incur significant manufacturing and material costs for the electronic device.

As can be appreciated from the above discussion, much inconvenience and/or cost may be associated with the convention arrangements for removing and securing lids of electronic devices.

SUMMARY OF INVENTION

An embodiment of the present invention relates to an electronic device. The electronic device may include a first side and a second side. The electronic device may also include a lid configured to cover an opening on the first side. The lid may include an interior side. The interior side may be invisible from outside of the electronic device when the lid covers the opening. The electronic device may also include a latching mechanism including a slider configured to slide along at least one of the lid and the first side for latching the lid at the interior side. The electronic device may also include a control unit disposed on the second side and configured to actuate movement of the slider.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
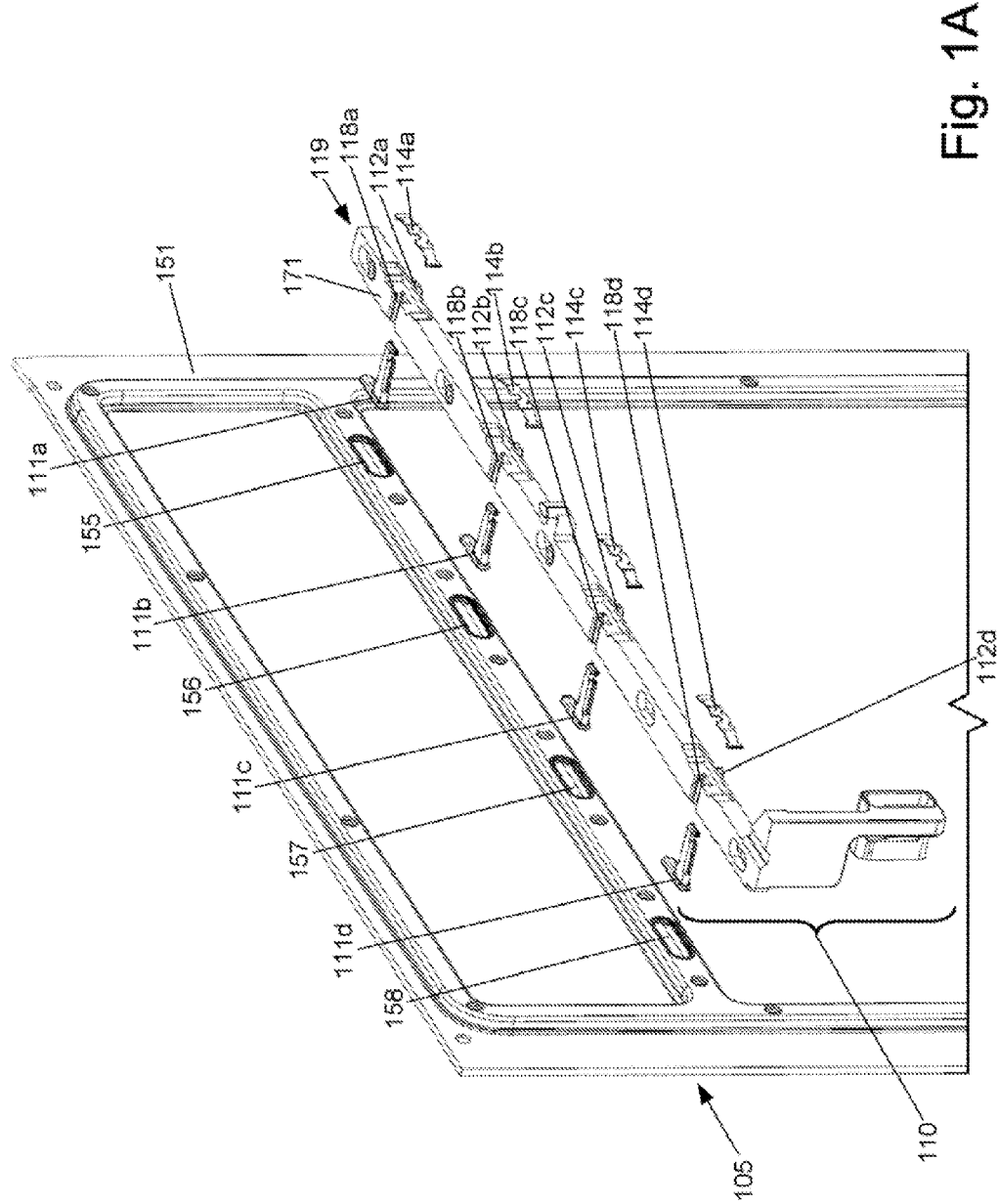
FIG. 1A illustrates a partial perspective view of a lid of an electronic device and an exploded view of a latching mechanism for latching the lid in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the invention relate to a latching mechanism for latching a lid of an electronic device. For example, the electronic device may represent one or more of a computing device (e.g., a computer), a networking device (e.g., a switch), an entertainment device (e.g., a television), etc. The lid may be configured to cover an opening on a first side of the electronic device. The latching mechanism may include a slider configured to slide along the lid and/or the first side.

The latching mechanism may further include a control unit (e.g., handle, knob, slider, switch, etc.) disposed on a second side of the electronic device and configured to actuate movement of the slider.

The latching mechanism may also include a first set of latching units (e.g., hooks, tangs, pins, receivers, apertures, channels, etc.) disposed on the slider and configured to latch an interior side of the lid. The interior side of the lid may be invisible from outside of the electronic device when the lid covers the opening.

The latching mechanism may also include a second set of latching units (e.g., hooks, tangs, pins, receivers, apertures, channels, etc.) disposed on the slider and configured to secure one or more electronic components in place inside the electronic device when the first set of latching units latches the interior side of the lid.

The first set of latching units and the second set of latching units may be disposed on two different sides of the slider. Alternatively or additionally, the first set of latching units and the second set of latching units may perform latching/unlatching actions from two different sides of the slider.

The second set of latching units may be configured to latch at least a first carrier disposed inside the electronic device when the first set of latching units latches the lid. The first carrier may be configured to carry at least a first electronic component. In one or more embodiments, the first electronic component may represent at least one of a storage device, a memory module, etc. For example, the first electronic component may represent at least one of a magnetic disk drive, an optical disk drive, a magneto-optical disk drive, a solid-state storage device, etc.

The latching mechanism may further include a third set of latching units (e.g., hooks, tangs, pins, receivers, apertures, channels, etc.) configured to latch at least a second carrier disposed inside the electronic device when the first set of latching units latches the lid. The second carrier may be configured to carry at least a second electronic component. The first electronic component and the second electronic component may represent different electronic component types or the same electronic component type.

The first set of latching units, the second set of latching units, and the third set of latching units may be disposed on three different sides of the slider. Alternatively or additionally, the first set of latching units, the second set of latching units, and the third set of latching units may perform latching/unlatching actions from three different sides of the slider The slider may be secured inside the electronic device by one or more mounting elements (e.g., pins, screws, hooks, etc.). The one or more mounting elements may be configured to guide translation of the slider.

The slider may also include one or more visual indicators configured to indicate whether one or more components (e.g., the one or more electronic components and/or one or more corresponding carriers) inside the electronic device are latched by the latching mechanism. The one or more visual indicators may be visible through one or more channels. The one or more channels may be configured to limit movement of the first set of latching units.

The slider may include a coating configured to tune friction between the slider and an associated contact surface inside the electronic device. The coating may be formed of a material including polytetrafluoroethylene (PTFE), such as Teflon®.

One or more embodiments of the invention relate to an electronic device that includes the latching mechanism or a variation of the latching mechanism.

The features and advantages of the present invention may be better understood with reference to the figure and discussions that follow.

FIG. 1A illustrates a partial perspective view of a lid 105 of an electronic device and an exploded view of a latching mechanism 110 in accordance with one or more embodiments of the present in invention. Latching mechanism 110 may include a first set of latching units, including one or more latching units, such as latching units 111a-d. configured to latch a set of mating units, such as mating units 155-158, disposed on an interior side 151 of lid 105. Interior side 151 may be invisible from outside of the electronic device when lid 105 is installed on the electronic device.

Latching units 111a-d may be disposed on a first side 171 of slider 159 of latching mechanism 110. In one or more embodiments, one or more of latching units 111a-d may include a male feature. Alternatively or additionally, one or more of mating features 155-158 may include a male feature.

Latching mechanism 110 may also include a set of channels 118a-d configured to accommodate latching units 111a-d. Latching mechanism 110 may also include a set of fastening units 114a-d configured to secure latching units 111a-d at corresponding channels 111a-d, respectively.

Figure 1B:
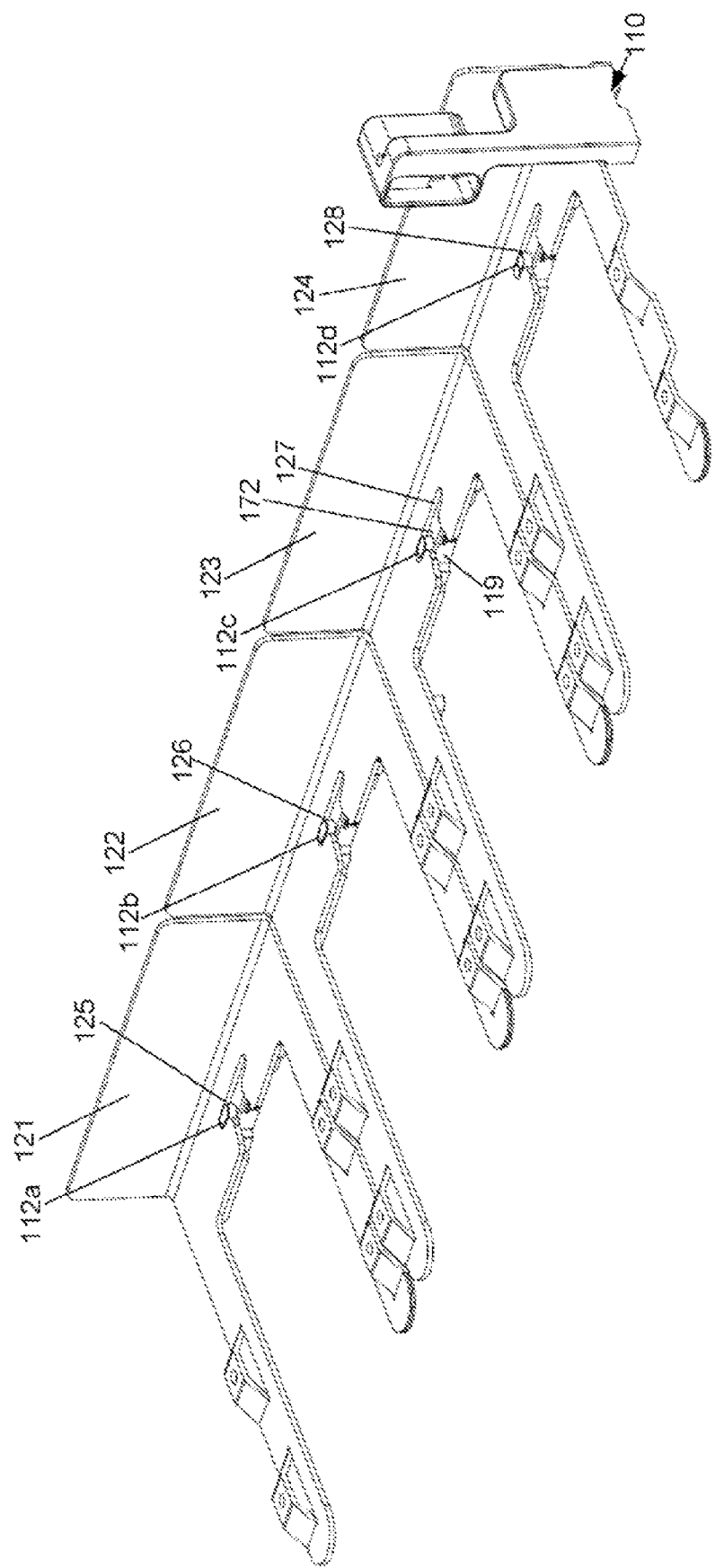
FIG. 1B illustrates a perspective view of hard disk drive (HDD) carriers latched by the latching mechanism.

FIG. 1B illustrates a perspective view of hard disk drive (HDD) carriers 121-124 latched by latching mechanism 110. HDD carriers 121-124 may be disposed inside an electronic device for carrying hard disk drives. Latching mechanism 110 may include a second set of latching units, including one or more latching units, such as latching units 112a-d, configured to latch mating units, such as mating units 125-128, of HDD carriers 121-124, respectively. With HDD carriers 121-124 latched by latching mechanism 110, the hard disk drives may be secured in place inside the electronic device.

The second set of latching units and the first set of latching units (discussed in the example of FIG. 1A) may be disposed on different sides of a slider 119 of latching mechanism 110. Latching units 112a-d may be disposed on a second side 172 of slider 119 of latching mechanism 110. In one or more embodiments, one or more of latching units 112a-d may include a male feature. Alternatively or additionally, one or more of mating units 125-128 may include a male feature.

Figure 1C:
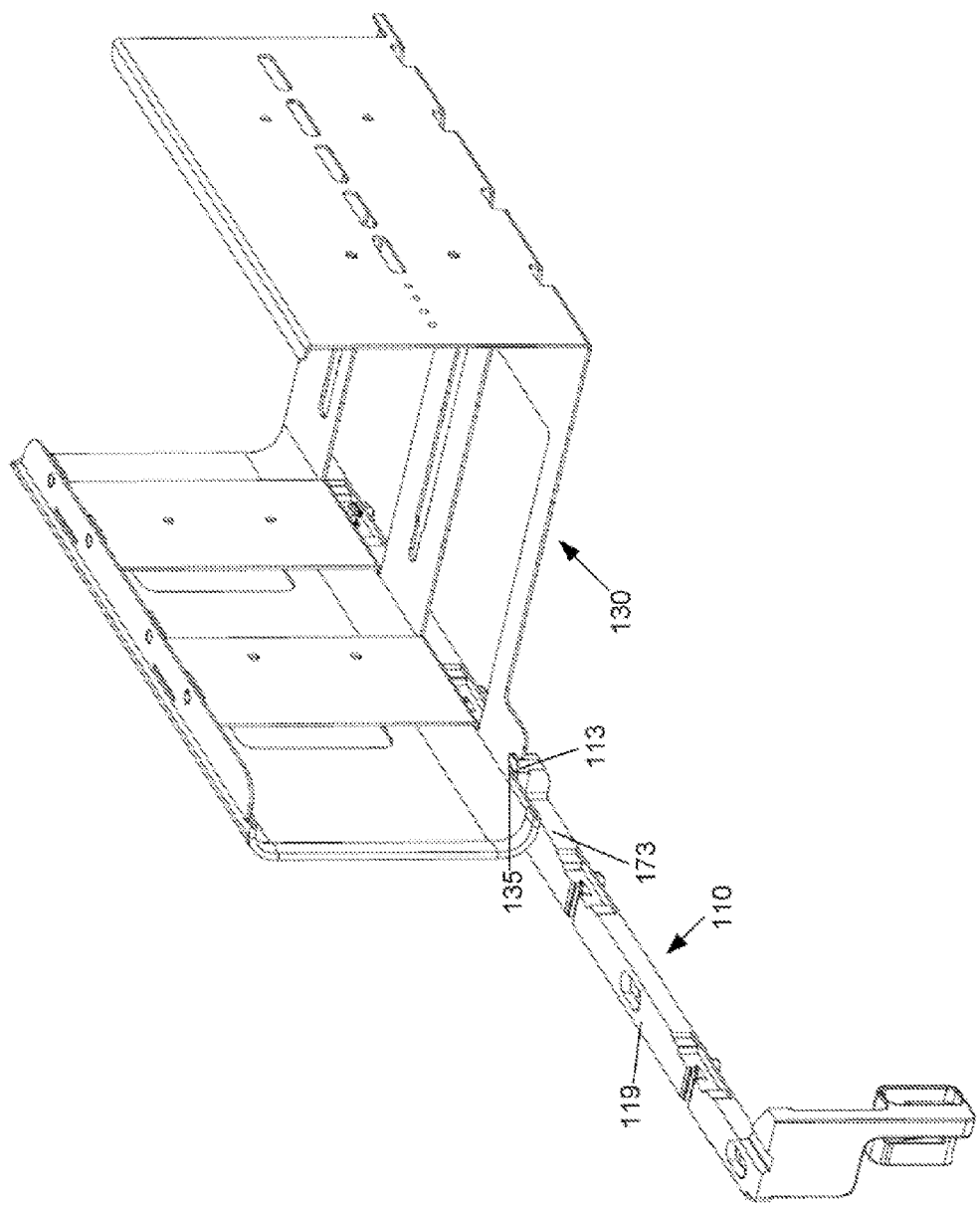
FIG. 1C illustrates a perspective view of an optical disc drive (ODD) carrier latched by the latching mechanism in accordance with one or more embodiments of the present invention.

FIG. 1C illustrates a perspective view of an optical disc drive (ODD) carrier 130 latched by latching mechanism 110 in accordance with one or more embodiments of the present invention. ODD carrier 130 may be disposed inside an electronic device and configured to carry an optical disk drive, such as a CD drive or a DVD drive. Latching mechanism 110 may include a third set of latching units, including one or more latching units, such as latching unit 113 configured to one or more latching units, such as latch mating unit 135, of ODD carrier 130. With ODD carrier 130 latched by latching mechanism 110, the optical disk drive may be secured in place inside the electronic device.

Latching unit 113 may be disposed on a third side 173 of slider 119 of latching mechanism 110. In one or more embodiments, latching unit 113 may include a male feature. Alternatively, mating unit 135 may include a male feature.

Figure 1D:
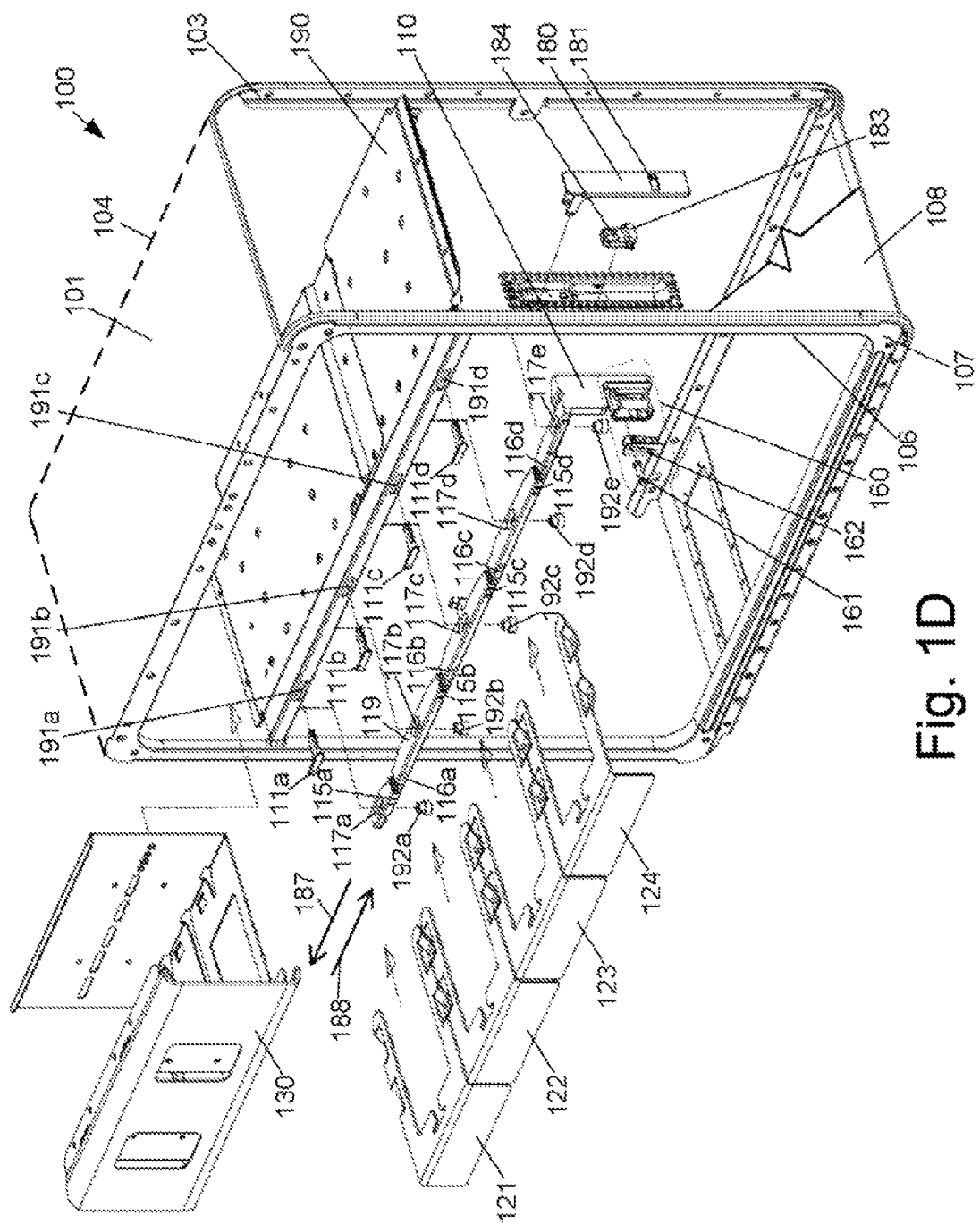
FIG. 1D illustrates a partial exploded view of an electronic device including the latching mechanism in accordance with one or more embodiments of the present invention.

FIG. 1D illustrates a partial exploded view of an electronic device 100 in accordance with one or more embodiments of the present invention. Electronic device 100 may include a housing 101 (represented/indicated by a frame 103, an outline 104, etc.) configured to accommodate a plurality of electronic components.

The electronic components may include an optical disk drive carried by ODD carrier 130. Alternatively or additionally, the electronic components may Include one or more hard disk drives carried by one or more of HDD carrier 121-124.

Electronic device 100 may also include lid 105 (shown in the example of FIG. 1A) for covering an opening 106 on first side 107 of housing 101, for example, for protecting the components inside 101 and for reinforcing the structure of housing 101.

Electronic device 100 may also include latching mechanism 310 configured to simultaneously latch two or more components of electronic device 100, such as lid 105, one or more of HDD carriers 121-124, and ODD carrier 130.

Electronic device 100 may also include a shelf 190 configured to support/carry ODD carrier 530, HDD carrier 121-124, and/or latching mechanism 110. Electronic device 100 may include a set of mounting elements 192a-e configured to mount latching mechanism 110, through channels 117a-e on slider 119, onto shelf 190. Mounting elements 192a-e may also be configured to guide movement (e.g., translation) of latching mechanism 110 by slidably engaging channels 117a-e. Latching units 111a-d may be installed on slider 119 through channels 191a-d of shelf 190. Channels 191a-d may be configured to guide movement of latching units 111a-d.

Slider 119 may include a coating for tuning friction between slider 119 and an associated contact surface of shelf 190. Accordingly, integrity, durability, and performance of latching mechanism 110 may be optimized. The coating may be formed of a material including polytetrafluoroethylene (PTFE), such as Teflon®.

Slider 119 may also include one or more visual indicators, such as indicators 116a-d and 115a-d, configured to indicate whether components inside housing 101, such as ODD carrier 130 and HDD carriers 121-124, are latched. When the components are latched, indicators 116a-d may be visible through channels 191a-d. When the components are unlatched, visual indicators 115a-d are visible through channels 191a-d.

Electronic device 100 may also include a control unit 180 configured to actuate movement of latching mechanism 110 through a biasing mechanism 100. Biasing mechanism 160 may include a sliding pin and a channel. Alternatively or additionally, biasing mechanism 160 may include a cam mechanism and/or a spring mechanism. Through biasing mechanism 160, control unit 180 may actuate latching mechanism 110 to translate in a latching direction 187 to simultaneously latch multiple components, for example, including lid 105, HDD carriers 121-124, and ODD carrier 130. Through biasing mechanism 160, control unit 180 may also actuate latching mechanism 110 to translate in an unlatching direction 188 to simultaneously unlatch the components. In one single action of control unit 180, multiple components may be latched or unlatched simultaneously. Advantageously, no external/additional tool is required, latching and unlatching are convenient and easy, and there are no fasteners to be lost.

Control unit 180 may be disposed on a second side 108 that is perpendicular to first side 107, where lid 105 is disposed. Accordingly, lid 105 may be latched and unlatched even if first side 107 is very close to a wall or other objects, without electronic device 100 or the objects being moved.

Electronic device 100 may also include a locking unit 183. Locking unit 183 may be configured to rotate to a locking position such that a locking portion 184 protrudes through aperture 181 of control unit 180. A lock, such as a combination lock, may apply at the locking portion for locking control unit 180, such that lid 105 may not be removed and that security for components inside electronic device 100 may be improved.

As can be appreciated from the foregoing, embodiments of the present invention may require only one single action on a control unit to simultaneously latch or unlatch multiple components of an electronic device, including the lid of the electronic device. There may be no external/additional tool required for removing/securing the lid. Advantageously, servicing the electronic device may be convenient and easy. Further, there may be no fasteners associated with the lid to be lost.

Since multiple components may be secured in place through only one single action, assembly of the electronic device may be simplified. As a result, manufacturing cost for the electronic device may be reduced.

By eliminating the need for multiple fasteners and mating structures/features for installing the lid, embodiments of the invention may effectively the part count for the electronic device. Advantageously, manufacturing and material costs for the electronic device may be further reduced.

Further, since there are no fasteners and mating structures/features on the external surface of the lid, the appearance of the electronic device may be aesthetically desirable. Cleaning of the electronic device also may be simplified.

Embodiments of the invention may also provide visual indications for the latching status of components inside the electronic device. Accordingly, the components may be appropriately handled, and therefore likelihood of damage to the components may be advantageously reduced.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alternations, permutations, and equivalents as fall within the true spirit and scope of the present invention.

What is claimed is:

1. An electronic device comprising:
   a first side;
   a second side;
   a lid configured to cover an opening on the first side, the lid including an interior side, the interior side invisible from outside of the electronic device when the lid covers the opening;
   a latching mechanism including a slider configured to slide along at least one of the lid and the first side for latching the lid at the interior side, the latching mechanism comprising;
   a first set of latching units disposed on the slider and configured to latch the interior side of the lid, the interior side of the lid being invisible from outside of the electronic device when the lid covers the opening, and
   a second set of latching units disposed on the slider and configured to secure one or more electronic components in place inside the electronic device when the first set of latching units latches the interior side of the lid; and
   a control unit disposed on the second side and configured to actuate movement of the slider.

2. The electronic device of claim 1 wherein the second side is perpendicular to the first side.

3. The electronic device of claim 1 wherein the second set of latching units is configured to latch at least a first carrier disposed inside the electronic device when the first set of latching units latches the lid, the first carrier configured to carry at least a first electronic component.

4. The electronic device of claim 3 wherein the first electronic component represents at least one of a storage device and a memory module.

5. The electronic device of claim 3 wherein the first electronic component represents at least one of a magnetic disk drive, an optical disk drive, a magneto-optical disk drive, and a solid state storage device.

6. The electronic device of claim 3 wherein the latching mechanism is further configured to include a third set of latching units configured to latch at least a second carrier disposed inside the electronic device when the first set of latching units latches the lid, the second carrier configured to carry at least a second electronic component.

7. The electronic device of claim 6, wherein the first electronic component and the second electronic component represent different electronic component types.

8. The electronic device of claim 6 wherein the first set of latching units, the second set of latching units, and the third set of latching units being disposed on three different sides of the slider.

9. The electronic device of claim 1 further comprising one or more mounting elements configured to secure the slider inside the electronic device, the one or more mounting elements further configured to guide translation of the slider.

10. The electronic device of claim 1 wherein the slider includes a visual indicator configured to indicate whether one or more components inside the electronic device are latched by the latching mechanism.

11. The electronic device of claim 1 wherein the slider includes a plurality of visual indicators configured to indicate whether one or more components inside the electronic device are latched by the latching mechanism, the plurality of visual indicators being visible through a plurality of channels, the plurality of channels being configured to limit movement of a plurality of latching units disposed along the slider.

12. The electronic device of claim 1 further comprising a locking unit configured to rotate to a locking position such that a locking portion of the locking unit protrude through the second unit for receiving a lock.

13. The electronic device of claim 1 wherein the slider includes a coating configured to tune friction between the slider and an associated contact surface inside the electronic device.

14. The electronic device of claim 13 wherein the coating is formed of a material including polytetrafluoroethylene (PTFE).

15. A latching mechanism for latching a lid of an electronic device, the lid covering an opening on a first side of the electronic device, the latching mechanism comprising:
   a slider configured to slide along the lid;
   a first set of latching units disposed on the slider and configured to latch an interior side of the lid, the interior side of the lid being invisible from outside of the electronic device when the lid covers the opening; and
   a second set of latching units disposed on the slider and configured to secure one or more electronic components in place inside the electronic device when the first set of latching units latches the interior side of the lid.

16. The latching mechanism of claim 15 further comprising a control unit disposed on a second side of the electronic device and configured to actuate movement of the slider.

17. The latching mechanism of claim 15 wherein the first set of latching units and the second set of latching units are disposed on two different sides of the slider.

18. The latching mechanism of claim 15 wherein the second set of latching units is configured to latch at least a first carrier disposed inside the electronic device when the first set of latching units latches the lid, the first carrier configured to carry at least a first electronic component.

19. The latching mechanism of claim 18 wherein the first electronic component represents at least one of a storage device and a memory module.

20. The latching mechanism of claim 18 further comprising a third set of latching units configured to latch at least a second carrier disposed inside the electronic device when the first set of latching units latches the lid, the second carrier configured to carry at least a second electronic component.

21. The latching mechanism of claim 20 wherein the first electronic component and the second electronic component represent different electronic component types.

22. The latching mechanism of claim 20 wherein the first set of latching units, the second set of latching units, and the third set of latching units are disposed on three different sides of the slider.

23. The latching mechanism of claim 15 wherein the slider is secured inside the electronic device by one or more mounting elements, the one or more mounting elements configured to guide translation of the slider.

24. The latching mechanism of claim 15 wherein the slider includes a visual indicator configured to indicate whether one or more components inside the electronic device are latched by the latching mechanism.

25. The latching mechanism of claim 15 wherein the slider includes a plurality of visual indicators configured to indicate whether one or more components inside the electronic device are latched by the latching mechanism, the plurality of visual indicators being visible through a plurality of channels, the plurality of channels being configured to limit movement of the first set of latching units.

26. The latching mechanism of claim 15 wherein the slider includes a coating configured to tune friction between the slider and an associated contact surface inside the electronic device.

27. A method, comprising:
   providing a first side, a second side, and a lid of an electronic device;
   providing a latching mechanism for latching the lid of the electronic device, the lid covering an opening on a first side of the electronic device, the latching mechanism comprising:
      a slider configured to slide along the lid,
      a first set of latching units disposed on the slider and configured to latch an interior side of the lid, the interior side of the lid being invisible from outside of the electronic device when the lid covers the opening, and
      a second set of latching units disposed on the slider and configured to secure one or more electronic components in place inside of the electronic device when the first set of latching units latches the interior side of the lid; and
   assembling at least the first side, the second side, the lid and the latching mechanism to form at least a part of the electronic device.

28. The method of claim 27 wherein the second side is perpendicular to the first side.

29. The method of claim 27 wherein the second set of latching units is configured to latch at least a first carrier disposed inside the electronic device when the first set of latching units latches the lid, the first carrier configured to carry at least a first electronic component.

30. The method of claim 29 wherein the first electronic component represents at least one of a storage device and a memory module.

31. The method of claim 29 wherein the first electronic component represents at least one of a magnetic disk drive, an optical disk drive, a magneto-optical disk drive, and a solid state storage device.

32. The method of claim 27 further comprising:
   providing one or more mounting elements configured to secure the slider inside the electronic device, the one or more mounting elements further configured to guide translation of the slider.

33. The method of claim 27 wherein the slider includes a visual indicator configured to indicate whether one or more components inside the electronic device are latched by the latching mechanism.

34. The method of claim 27 wherein the slider includes a plurality of visual indicators configured to indicate whether one or more components inside the electronic device are latched by the latching mechanism, the plurality of visual indicators being visible through a plurality of channels, the plurality of channels being configured to limit movement of a plurality of latching units disposed along the slider.

35. An electronic device comprising:
   a first side;
   a second side;
   a lid configured to cover an opening on the first side, the lid including an interior side, the interior side invisible from outside of the electronic device when the lid covers the opening;
   a latching mechanism including a slider configured to slide along at least one of the lid and the first side for latching the lid at the interior side, wherein the latching mechanism includes a first set of latching units and a second set of latching units, each of the first set of latching units and the second set of latching units including at least one latching unit, the first set of latching units and the second set of latching units being disposed on two different sides of the slider; and a control unit disposed on the second side and configured to actuate movement of the slider.

36. The electronic device as recited in claim 35 wherein the latching mechanism is further configured to secure one or more electronic components in place inside the electronic device when the latching mechanism latches the lid.

37. The electronic device of claim 35 wherein the latching mechanism is configured to latch at least a first carrier disposed inside the electronic device when the latching mechanism latches the lid, the first carrier configured to carry at least a first component.

38. The electronic device of claim 36 wherein the first electronic component represents at least one of a storage device and a memory module.

39. The electronic device of claim 36 wherein the first electronic component represents at least one of a magnetic disk drive, an optical disk drive, a magneto-optical disk drive, and a solid state storage device.

40. The electronic device of claim 36 wherein the latching mechanism is further configured to latch at least a second carrier disposed inside the electronic device when the latching mechanism the lid, the second carrier configured to carry at least a second electronic component.

* * * * *

UNITED STATES PATENT AND TRADEMARK OFFICE
CERTIFICATE OF CORRECTION

| | | |
|---|---|---|
| PATENT NO. | : 7,843,687 B2 | Page 1 of 1 |
| APPLICATION NO. | : 11/831231 | |
| DATED | : November 30, 2010 | |
| INVENTOR(S) | : Mariano et al. | |

It is certified that error appears in the above-identified patent and that said Letters Patent is hereby corrected as shown below:

In column 3, line 36, after "present" delete "in".

In column 3, line 38, delete "111 a-d." and insert -- 111 a-d --, therefor.

In column 3, line 44, delete "159" and insert -- 119 --, therefor.

In column 4, line 28, delete "Include" and insert -- include --, therefor.

In column 4, line 36, delete "310" and insert -- 110 --, therefor.

In column 4, line 40, delete "530," and insert -- 130, --, therefor.

In column 4, line 65, delete "100." and insert -- 160. --, therefor.

In column 6, line 37, in Claim 5, delete "solid state" and insert -- solid-state --, therefor.

In column 10, line 10, in Claim 40, after "mechanism" insert -- latches --.

Signed and Sealed this
Twenty-second Day of November, 2011

David J. Kappos
*Director of the United States Patent and Trademark Office*